Aug. 21, 1945.  C. C. HEIN  2,383,311
CONTACT FOR COPPER OXIDE RECTIFIERS
Filed April 15, 1942
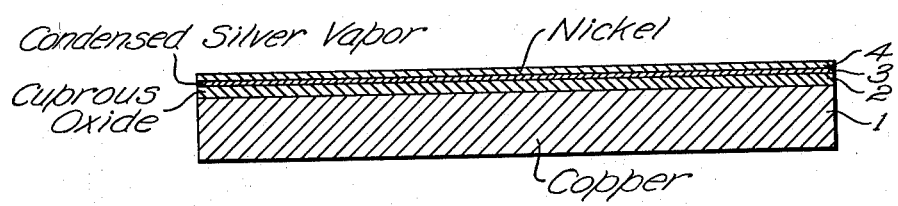
WITNESSES:
Robert C. Baird
Nw. L. Groove
INVENTOR
Carl C. Hein.
BY
F. W. Lyle
ATTORNEY Patented Aug. 21, 1945

2,383,311

UNITED STATES PATENT OFFICE 2,383,311

CONTACT FOR COPPER OXIDE RECTIFIERS

Carl C. Hein, Forest Hills, Pa., assignor to Westinghouse Electric Corporation, East Pittsburgh, Pa., a corporation of Pennsylvania Application April 15, 1942, Serial No. 439,093

4 Claims. (Cl. 175—366)

My invention relates to rectifiers of the dry contact-layer type and, in particular, relates to methods of providing electrical contact-layers for conducting electrical current to such rectifiers.

Rectifiers of which the copper oxide rectifier and the selenium rectifier may be taken as examples, in which an inter face which exhibits unilateral electrical conductivity is found to exist between two layers of different structure, have come into extensive use within the recent past. In such rectifiers a problem arises of making electrical contact for conducting the load current into or out of one or more of the above-mentioned layers. One method which has been found useful has involved the production of a metallic layer by electroplating on the surface of such base-layers. In the case of the copper oxide rectifier, for example, this process involved a reduction of a thin layer on the outer surface of the copper oxide (for example by electrolyses), and the subsequent deposition on this reduced surface of a sufficiently thick layer of nickel by immersion in a nickel-plating bath.

However, the base-layer, i. e., the cuprous oxide in the example just mentioned, has proved to be somewhat porous in some instances, and cases have been found in which the electrolyte from the bath apparently penetrated cracks or pores in the cuprous oxide and formed conducting paths through the latter from the underlying base-metal (i. e., the mother copper in the example just mentioned) to the nickel layer on the outer face of the cuprous oxide. Such conducting paths would act as short-circuits through which current would pass, thereby short-circuiting the inter face having unilateral electrical conductivity and in many cases rendering the rectifier useless.

In accordance with my invention, I prevent difficulties of the type above mentioned by coating the outer face of one or more of the layers comprised in the rectifier with a covering of condensed metallic vapors.

The single figure of the drawing illustrates such a rectifier.

Thus, in the case of the copper oxide rectifier used as an example, I may enclose the unit either before or after the outer face of the cuprous oxide has been reduced to copper in a suitable container sufficiently close to a body or wire of electrically-heated silver so that silver molecules evaporated from the surface of the latter sublime onto and form a coating substantially covering the entire surface of the rectifier unit. In the case of a copper oxide rectifier, I have usually found it desirable to scour the surface of the oxide layer with 150 mesh silicon carbide carried by an air blast the latter being somewhat analogous to the ordinary method of sand blasting surfaces. While I have described silver as a desirable metal to use in producing the condensed vapor coating, other metals, such as nickel, tin, copper and gold, constitute alternatives useful in certain instances.

After producing the condensed metal coating, I electroplate the surface of the latter with nickel or other suitable material in accordance with conventional methods.

I have found that covering the outer surface of the oxide layer with evaporated metal prevents the short-circuiting described above as met with when the electrolytic plating bath is subsequently used. The thicker the evaporated metal layer is made, the less probability there is of penetration of electrolyte through it, but, of course, the thicker this layer is made, the greater will be the cost of carrying out this step in the process. Commercial considerations thus determine in an obvious way when the further increase of cost by thickening the layer is not warranted by the increased freedom of the rectifier production from electrolytic difficulties. Such a balance can readily be determined by manufacturing engineers from these considerations.

When completed, the rectifier will, accordingly, be of the form schematically illustrated in the drawing and comprising a base plate 1 of copper having on part of its outer surfaces a layer of cuprous oxide 2 covered in turn by a layer 3 of condensed silver vapor, the latter being coated with an electrolytically deposited coating 4 of nickel.

Processes for manufacturing oxidized copper rectifier blanks are described in Grondahl Patent No. 1,640,335, Geiger Patent No. 1,892,832, and my copending application Serial No. 286,613, filed July 26, 1939. Methods suitable for the manufacture of selenium rectifiers are described in Lotz Patent No. 2,121,603.

I claim as my invention:

1. The method of manufacturing copper oxide rectifiers which comprises heating a copper blank in contact with an oxidizing atmosphere at a temperature just below its melting point, cooling it to room temperature, removing any cupric oxide formed on its surface, condensing a vaporized metal on a portion of the oxidized surface, and electroplating the surface of the sublimed metal.

2. The method of manufacturing copper oxide rectifiers which comprises heating a copper blank in contact with an oxidizing atmosphere at a temperature just below its melting point, cooling it to room temperature, removing any cupric oxide formed on its surface, condensing vaporized silver on a portion of the oxidized surface, and electroplating the surface of the sublimed metal.

3. The method of manufacturing copper oxide rectifiers which comprises heating a copper blank in contact with an oxidizing atmosphere at a temperature just below its melting point, cooling it to room temperature, scouring the oxidized surface with an air blast carrying abrasive particles, condensing a vaporized metal on a portion of the oxidized surface and electroplating the surface of the sublimed metal.

4. The method of manufacturing copper oxide rectifiers which comprises heating a copper blank in contact with an oxidizing atmosphere at a temperature just below its melting point, cooling it to room temperature, scouring the oxidized surface with an air blast carrying abrasive particles, condensing vaporized silver on a portion of the oxidized surface, and electroplating the surface of the sublimed metal.

CARL C. HEIN.